United States Patent [19]

Murata et al.

[11] 4,429,467
[45] Feb. 7, 1984

[54] APPARATUS FOR MEASURING TOE-IN OF A MOTOR VEHICLE WHEEL

[75] Inventors: Yoichi Murata, Nagoya; Ryozo Kishishita, Toyota; Tadao Nakata, Aichi, all of Japan

[73] Assignee: Toyota Jidosha Kogyo Kabushiki Kaisha, Toyota, Japan

[21] Appl. No.: 269,719

[22] Filed: Jun. 2, 1981

[30] Foreign Application Priority Data

Jun. 10, 1980 [JP] Japan ................................ 55-79854[U]

[51] Int. Cl.³ .............................................. G01B 5/24
[52] U.S. Cl. .................................... 33/203; 33/203.15
[58] Field of Search ................. 33/203, 203.15, 203.16, 33/203.18, 203.12

[56] References Cited

U.S. PATENT DOCUMENTS

| 1,992,521 | 2/1935 | Creagmile | 33/203.12 |
| 3,855,709 | 12/1974 | Hirmann | 33/203 |
| 4,034,479 | 7/1977 | Senften | 33/203.15 |

FOREIGN PATENT DOCUMENTS 1330404 9/1973 United Kingdom ............. 33/203.15

Primary Examiner—Willis Little
Attorney, Agent, or Firm—Kenyon & Kenyon

[57] ABSTRACT

An apparatus for measuring toe-in of front wheels of a motor vehicle. The apparatus includes units for measuring the inclination of corresponding wheels.

The units are connected to a circuit displaying a value indicating lateral offset distance between the respective rear and front of each front wheel. Thus, equal distribution of tow-in to the right and left wheels is easily realized when the steering wheel is at the center position.

6 Claims, 6 Drawing Figures

APPARATUS FOR MEASURING TOE-IN OF A MOTOR VEHICLE WHEEL

BACKGROUND OF THE INVENTION

The present invention relates to an apparatus for measuring toe-in of front wheels in a motor vehicle.

In the prior art, a measurement of toe-in is effected by utilizing a dynamic toe-in tester so that a side force generated in the front wheels of a vehicle when the wheels rotate is equal to a predetermined value. In this prior art an equal distribution of the toe-in between the right and left wheels is not always maintained. Therefore, the prior art suffers from a drawback that the steering wheel is apt to be situated on an off-center position when the of the vehicle is running straight.

SUMMARY OF THE INVENTION

An object of the present invention is to provide an apparatus for measuring toe-in, capable of equally distributing toe-in between right and left wheels.

According to the present invention, in order to attain the object, an apparatus for measuring toe-in of wheels in a motor vehicle is disclosed, said apparatus comprising:

a pair of units each of which is adapted for measuring lateral offset distance between rear and front of a corresponding front wheel, one of said units comprising: a horizontally elongated plate having a length substantially equal to the outer diameter of a corresponding wheel, drive means for moving the plate so that the plate contacts the outer sidewall portion of the wheel, universal joint means for connecting the plate with the drive means so that the plate can, adjacent both ends thereof, uniformly contact the outer sidewall of the wheel, sensor means for detecting the degree of inclination which is formed between a horizontal transverse to the axis of rotation of the wheels and a longitudinal axis of the vehicle, and indicator means for indicating the lateral offset distance between the rear and front of the corresponding one wheel.

BRIEF DESCRIPTION OF ATTACHED DRAWINGS

FIG. 3 shows a diagrammatic view of a circuit for visually indicating toe-in.

Figure 5:
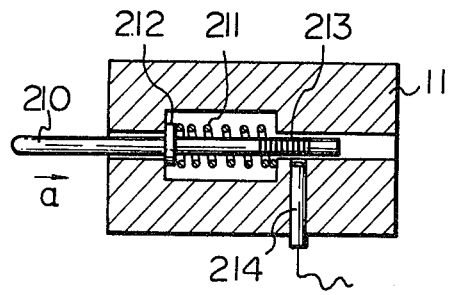
FIG. 5 shows a cross-sectional view of one of the sensor heads.
Figure 6:
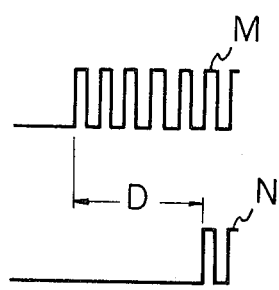

FIG. 6 diagrammatically shows signals issued from sensors in FIG. 5.

DETAILED DESCRIPTION OF A PREFERRED EMBODIMENT

Figure 1:
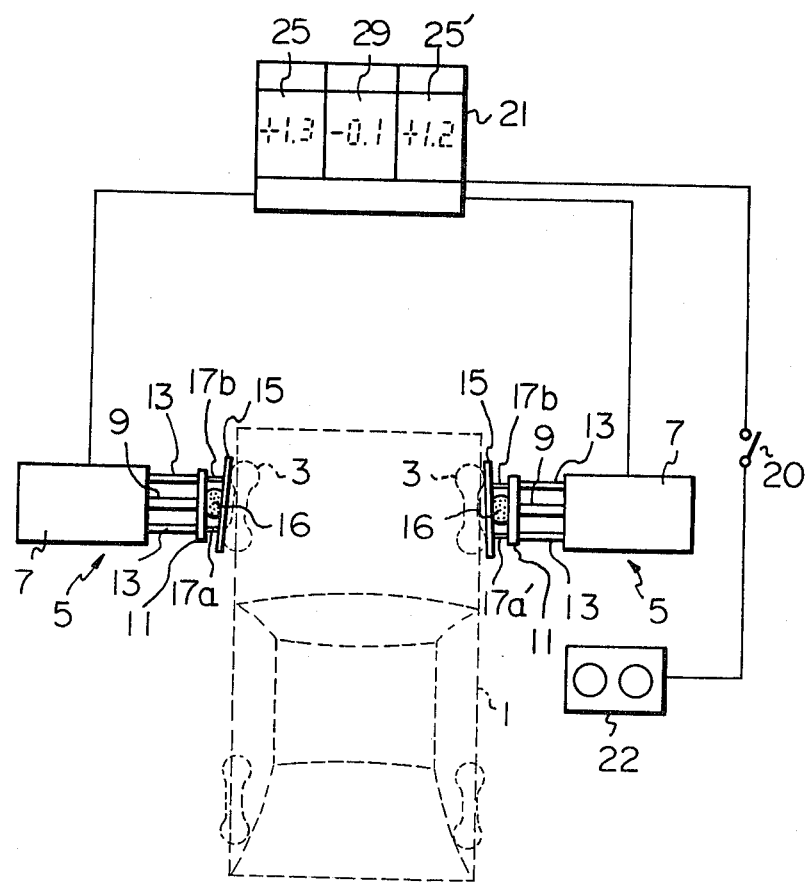
FIG. 1 shows a schematic view of the apparatus according to the present invention.
Figure 4:
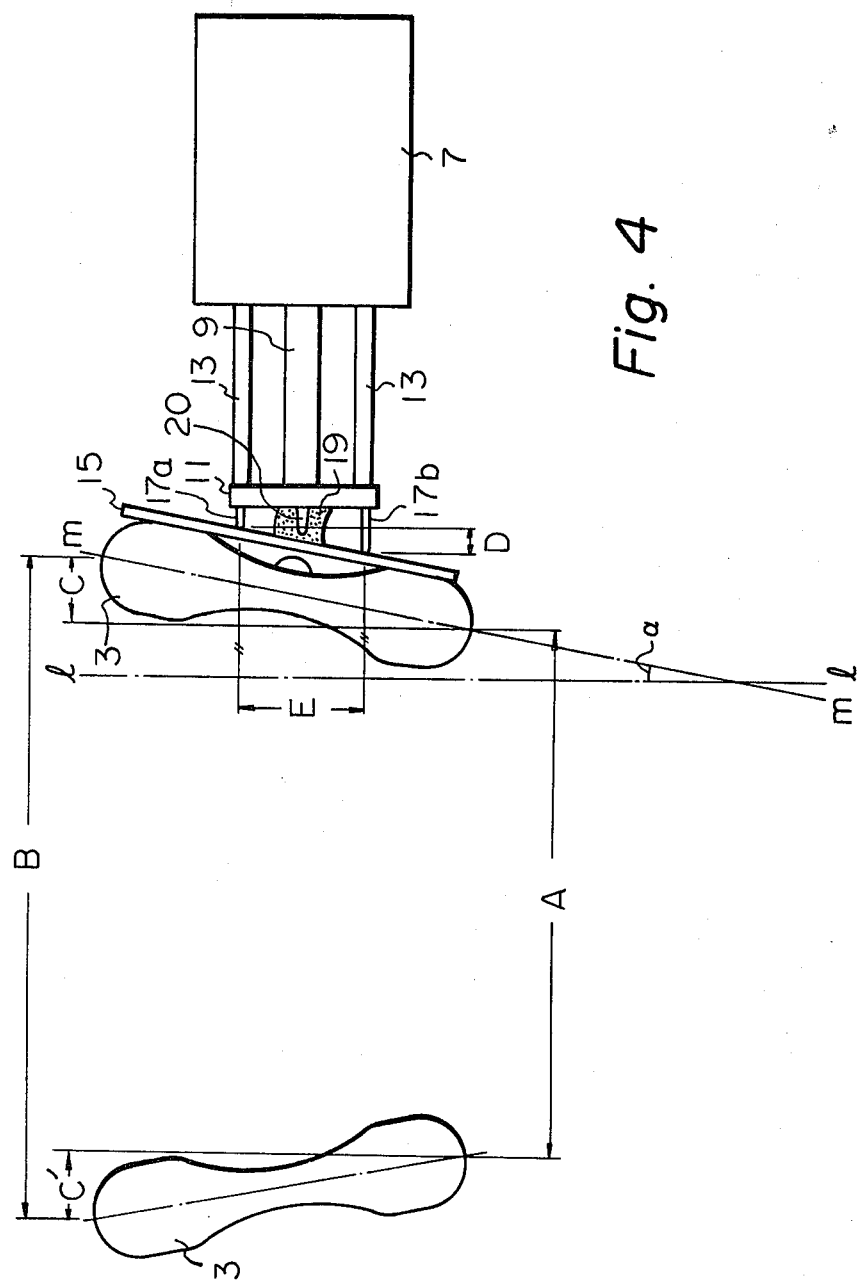
FIG. 4 shows a plain view of the unit in FIG. 2.

An embodiment of the present invention will now be described with reference to the attached drawings. In FIG. 1, a body 1 of a motor vehicle has a pair of front wheels 3. As is well known to those skilled in this art and as illustrated, in FIG. 4, toe-in is the difference between a distance A between the front of wheels 3 and a distance B between the rear of wheels 3. In FIG. 4, C and C' are lateral offset distances between rear and front of the respective wheels 3. The distance C or C' may be referred herein as a contribution of the wheel to toe-in. In this case (C+C') is equal to toe-in (B−A).

Figure 2:
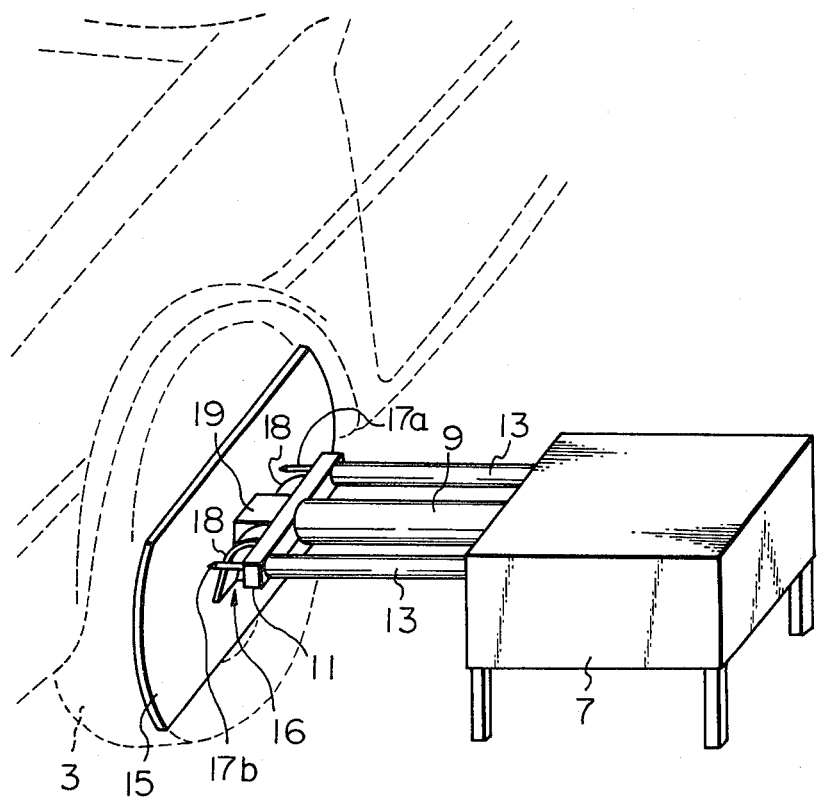
FIG. 2 shows a perspective view of a unit for detecting an inclination of one wheel.

Measuring units 5 are arranged on sides of wheels 3 remote from the body for measuring such distances C and C', respectively. As shown in FIG. 2, which is a perspective view of one of the units, each measuring unit is provided with a housing 7 fixedly mounted on the ground. In the housing 7 a fluid cylinder (not shown) is arranged, which is provided with a horizontally extending piston rod 9 which is transverse to the axis of the car. A sensor support member 11 is transversely connected to one end of the piston rod 9 remote from the housing 7. A pair of guide rods 13 are arranged on both sides of the piston rod 9. Each of the rods 13 is on one end thereof fixedly connected to the support member 11 and on the other end thereof slidably inserted into a horizontal guide hole in the housing 7, so that the sensor support member 11 can be moved toward and away from the wheel 3 in accordance with a reciprocal motion of the piston rod 9 when the fluid cylinder is operated.

A contact plate 15 is of substantially rectangular shape which is more or less convexed toward the wheel 3. The plate 15 has a horizontal dimension which is substantially the same as the outer diameter of the tire portion of the wheel 3. The plate 15 is connected to the support member 11 by a universal joint device 16. The joint device 16 includes a block 19 made of a soft material having resiliency, such as foam of polyurethane, which block 19 is on one end bonded to one side of the plate 15 away from the wheel 3. The other end of the block 19 is bonded to the support member 11. The joint 16 is further provided with a pair of pieces 18 made of thin resilient metallic material arranged on the sides of the block 19, respectively. One end of each piece 18 is connected to the plate 15, while the other end of each piece 18 is connected to the support member 11. As a result of this construction of the joint 16, the sensor plate 15 is connected to the support member without being drooped, while the plate 15 can be moved with respect to the support member 11 by a small force applied to the plate 15 when the plate 15 touches the tire portion of the wheel 3.

A pair of length sensors 17a and 17b are arranged adjacent to the ends of the support plate 11. Each of the sensors 17a and 17b is a so-called digital type which is, for example, constructed as schematically illustrated in FIG. 5. The sensor is comprised of a rod 210 horizontally movably inserted in the support member 11. A spring 211 urges the rod 210 so that a shoulder portion 212 engages with the support member 11. One end of the rod 210 projects from the support member 11. Adjacent the other end of the rod a plurality of equally axially spaced magnetized marks 213 are formed. A sensor head 214 of magnetic type is arranged in the support member 11 so that it faces the marks 213. When the rod 210 is moved toward the member 11 as shown by the arrow in FIG. 5, the sensor head 214 provides pulsative or digital signals, the number of pulses corresponding to the length of the motion of the rod 210. A combination of the sensors 17a and 17b allows the measurement of the distance C or C' as will be described later. As shown in FIG. 4 a limit switch 20 is mounted on the support member 11 so that an abutment member of the switch 20 faces the plate 15. The limit switch 20 is adapted for providing a signal for stopping the elongation of the piston 9 as will be described later.

The construction of one unit 5 arranged on one side of the car body 1 is the same as the construction of another unit arranged on the other side of the body. Therefore, the same reference numerals are used. However, with regard to sensors, for the convenience of the description hereinafter, reference numerals with dash are used, as indicated by 17a' and 17b'.

Figure 3:
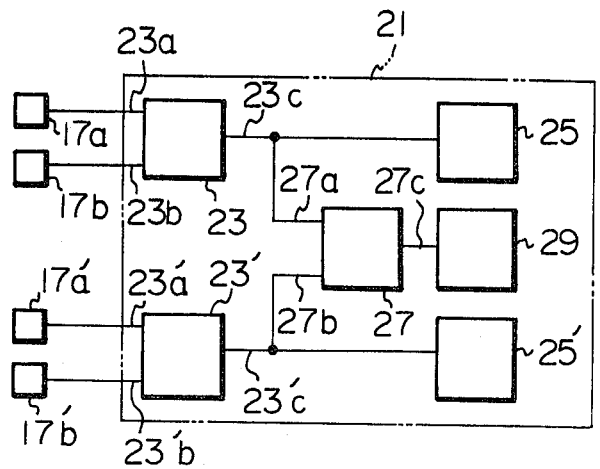

In FIG. 1, signals from both measuring units 5 are received by a unit 21 for calculating and indicating the values of toe-in of the respective wheels and a difference value between the right and left wheels. The unit is operated by the operation switch 22. Unit 21 is schematically constructed as shown by FIG. 3. The unit 21 is provided with a subtracting circuit 23 for calculating the distance C. The circuit 23 is provided with inputs 23a and 23b connected to the sensors 17a and 17b, respectively, for receiving signals indicating the length of the movement of the respective rods 210. The circuit 23 is further provided with an output 23c for issuing a signal indicating the difference between a value received at the input 23a and a value received at the input 23b. The output 23c is connected to a display unit 25 for visually indicating the value of the distance C of one wheel (e.g., the left wheel). The unit 21 is provided with another or second subtracting circuit 23' for calculating the distance C'. The circuit 23' is also provided with inputs 23'a and 23'b connected to the sensors 17a' and 17b', respectively. Connected to the output 23'c is a display unit 25' for visually indicating the distance C' of the right wheel. The unit 21 is provided with a third subtracting circuit 27 having inputs 27a and 27b which are connected to the output 23c and 23'c of the subtracting units 23 and 23' respectively, and output 27c connected to another display 29 for indicating a difference in the distance C and C'.

The operation of the present invention will be described hereinbelow.

The automobile is introduced into the measuring site and is stopped at a predetermined position located between a pair of the units 7. The cylinders are opened at a force of about 2 kg so that the piston rods 9 extend toward the respective wheels 3. As a result of this one end of each sensor plate 15 contacts the respective wheels 3. As each piston rod 9 continues to extend, the block 19 made of a soft elastic material such as polyurethane is deformed so that the other end of each plate 15 contacts the tire portion or side portion of the corresponding wheel. As is clear from the above, due to the action of the universal joint 16, the sensor plate 15 is obliquely situated so as to conform to an angle α formed by a horizontal line l—l parallel to a central line of the car and a horizontal line m—m perpendicular to the axis of the rotation of the wheel. The extension of the rod 9 is continued until the plate 15 is contacted by the limit switch 20.

When one end of the plate 15 contacts the left wheel 3, the plate 15 urges the rod 17a as shown by the arrow α in FIG. 5, so that a pulsative signal as shown by M in FIG. 6 is produced and is received by the input 23a of the subtracting circuit 23. When the other end of the plate 15 contacts the second rod 17b the plate 15 urges the rod 17b to move, so that a pulsative signal as shown by N in FIG. 6 is produced and is received by the input 23b. As a result of this, at the output 23c of the subtracting circuit 23, a signal indicating a number corresponding to the distance D in FIG. 4 is obtained. This signal is introduced into the circuit 25. In the circuit 25 a predetermined value corresponding to E is memorized.

Thus, the circuit can calculate the angle α and the distance C. The calculated value C is indicated on the display 25 as shown in FIG. 1.

A measurement of the other wheel is similarly effected by the signal from the sensors 17a', 17b'. The distance C' is indicated on the display circuit 25'.

A signal indicating the value C of one (left) wheel is introduced into the first input 27a of the subtractor 27, while a signal indicating the value C' of the other (right) wheel is introduced into the second input 27b of the subtracter 27. Therefore, the subtracter 27 provides, at the output thereof, a signal indicating the difference (C−C') between the wheels. The difference is indicated on the display 29.

As will be clear from the above, toe-in can be directly measured by detecting the distances C and C'. Therefore, a measurement of high accuracy is effected when compared with the prior art method wherein toe-in is indirectly measured by detecting the dynamic side force.

Since the difference in toe-in between a pair of wheels can be measured, toe-in can be equally distributed between the wheels. Tie rods for connecting the steering arms with a relay rod connected to pitman arm of a steering wheel are adjusted so that the values C and C' shown on the displays 25 and 25', respectively, are equal to a predetermined value while the difference between C and C' shown in the display 29 is reduced to zero. Thus, the steering wheel can be maintained in the center position when the car is running straight.

The sensor plate 15 is horizontally elongated so that no contact of the lower portion of tire axially outwardly expanded due to the mass of the vehicle takes place, which otherwise would adversely affect the accuracy of the measurement.

It should be noted any error due to trade marks and numbers or other marks formed on the surface of the tires will not take place, if the wheel is oriented so that both ends of the plate 15 simultaneously contact such marks.

While an embodiment has been described with reference to the attached drawings, many modifications and changes may be made by those skilled in this art without departing from the basic scope of the invention.

We claim:

1. Apparatus for measuring toe-in of a pair of left and right wheels of an automotive vehicle, the apparatus including a pair of units adapted to be positioned on opposite sides of a vehicle adjacent to corresponding wheels to be measured for toe-in, wherein each unit comprises:

an elongated contact member, the length of which corresponds approximately to the outer diameter of a tire on a wheel to be measured;

means for supporting the contact member with its longitudinal axis substantially horizontal and approximately parallel to the longitudinal axis of a vehicle being inspected, at a level corresponding approximately to the center of an adjacent wheel of the vehicle;

drive means for moving the support means toward and away from the adjacent wheel;

means for pivotally connecting the contact member to the support means to permit the contact member to uniformly contact front and rear laterally outermost side wall portions of a tire on said wheel adjacent to the respective ends of the contact member when the support member is moved toward the wheel by the drive means;

sensor means for detecting displacement of the horizontal axis of the contact member from a datum line parallel to the longitudinal axis of a vehicle being inspected, the sensor means comprising a pair of sensors carried by the support means and contacting the contact member at two longitudinally spaced points for providing signals indicating lateral displacement of said points from said datum line and means for calculating the difference between the displacement signals from said pair of sensors; and indicator means responsive to the sensor means for displaying a transverse displacement corresponding to a toe-in value for the wheel when the contact member contacts the front end rear side wall portions of a tire thereon.

2. Apparatus according to claim 1 wherein the drive means comprises a stationary housing and a fluid cylinder and piston connecting the support means to the housing.

3. Apparatus according to claim 1 wherein each of the sensors comprises:

a rod slidably projecting from the support means toward the contact member;

spring means for biasing the outer end of each rod into contact with the contact member; and a transducer for providing a signal corresponding to the displacement of the rod.

4. Apparatus for measuring toe-in of a pair of left and right wheels of an automotive vehicle the apparatus including a pair of units adapted to be positioned on opposite sides of a vehicle adjacent to corresponding wheels to be measured for toe-in, wherein each unit comprises:

a contact plate having a horizontal dimension equal to a preselected diameter of a tire and a wheel to be measured;

means for supporting the contact plate so that said horizontal dimension is approximately parallel to the longitudinal axis of a vehicle being inspected, said support means comprising a support member, a block made of resilient and soft material, said block having one surface bonded to the support member and another surface bonded to the contact plate, and a pair of spring pieces made of thin metallic material arranged on opposite sides of the block, each of the spring pieces being resiliently disposed between the support member and the contact plate;

drive means attached to the support member for moving the contact plate toward and away from the adjacent wheel;

sensor means for detecting displacement of the contact plate from a datum line parallel to the longitudinal axis of a vehicle being inspected; and indicator means responsive to the sensor means for displaying a transverse displacement distance corresponding to the toe-in value for the wheel when the contact plate contacts front and rear side wall portions of a tire on the wheel.

5. Apparatus according to claim 4 wherein said block is made of polyurethane foam.

6. Apparatus for measuring toe-in of a pair of left and right wheels of an automotive vehicle, the apparatus including a pair of units adapted to be positioned on opposite sides of a vehicle adjacent to corresponding wheels to be measured for toe-in, wherein each unit comprises:

an elongated contact member, the length of which corresponds approximately to the outer diameter of a tire on a wheel to be measured;

means for supporting the contact member with its longitudinal axis substantially horizontal and approximately parallel to the longitudinal axis of a vehicle being inspected, at a level corresponding approximately to the center of an adjacent wheel of the vehicle;

drive means for moving the support means toward and away from the adjacent wheel;

means for pivotally connecting the contact member to the support means to permit the contact member to uniformly contact front and rear laterally outermost side wall portions of a tire on said wheel adjacent to the respective ends of the contact member when the support member is moved toward the wheel by the drive means;

sensor means for detecting displacement of the horizontal axis of the contact member from a datum line parallel to the longitudinal axis of a vehicle being inspected;

indicator means responsive to the sensor means for displaying a transverse displacement corresponding to a toe-in value for the wheel when the contact member contacts the front and rear side wall portions of a tire thereon; and means for calculating the difference between the toe-in values provided by said pair of units.

* * * * *

UNITED STATES PATENT AND TRADEMARK OFFICE
CERTIFICATE OF CORRECTION

PATENT NO. : 4,429,467

DATED : February 7, 1984

INVENTOR(S) : Yoichi Murata, et al.

It is certified that error appears in the above—identified patent and that said Letters Patent is hereby corrected as shown below:

Column 1, line 16 after "the" delete "of the"

Column 3, line 38 change "The" to --An--

In the Abstract, line 7 change "tow-in" to --toe-in--

Signed and Sealed this

Twenty-fourth Day of April 1984

[SEAL]

*Attest:*

GERALD J. MOSSINGHOFF

*Attesting Officer*    *Commissioner of Patents and Trademarks*